United States Patent
Worman et al.

(10) Patent No.: US 10,533,727 B2
(45) Date of Patent: Jan. 14, 2020

(54) OPTICAL DIFFUSER FOR A PORTABLE LIGHT

(71) Applicant: Streamlight, Inc., Eagleville, PA (US)

(72) Inventors: William D. Worman, Phoenixville, PA (US); Thomas D. Boris, Collegeville, PA (US)

(73) Assignee: Streamlight, Inc., Eagleville, PA (US)

( * ) Notice: Subject to any disclaimer, the term of this patent is extended or adjusted under 35 U.S.C. 154(b) by 0 days.

(21) Appl. No.: 15/993,177

(22) Filed: May 30, 2018

(65) Prior Publication Data

US 2018/0283654 A1 Oct. 4, 2018

Related U.S. Application Data

(62) Division of application No. 14/640,829, filed on Mar. 6, 2015, now Pat. No. 10,030,847.

(Continued)

(51) Int. Cl.
| | |
|---|---|
| *F21V 7/00* | (2006.01) |
| *F21L 4/00* | (2006.01) |
| *F21V 5/00* | (2018.01) |
| *G02B 5/02* | (2006.01) |
| *F21V 23/04* | (2006.01) |
| *F21Y 115/10* | (2016.01) |
| *F21Y 113/13* | (2016.01) |
| *F21V 13/04* | (2006.01) |

(52) U.S. Cl.
CPC ............ *F21V 7/0091* (2013.01); *F21L 4/005* (2013.01); *F21V 5/006* (2013.01); *G02B 5/0215* (2013.01); *F21V 13/045* (2013.01); *F21V 23/0414* (2013.01); *F21Y 2113/13* (2016.08); *F21Y 2115/10* (2016.08)

(58) Field of Classification Search
CPC ........ F21V 7/0091; F21V 7/09; F21V 13/045; F21V 15/006; F21V 23/0414; G02B 5/0215; G02B 6/0055; F21L 4/005; F21Y 2115/10; F21Y 2113/13
See application file for complete search history.

(56) References Cited

U.S. PATENT DOCUMENTS

| | | |
|---|---|---|
| 3,860,811 A | 1/1975 | Slauter |
| 6,474,837 B1 | 11/2002 | Belliveau |

(Continued)

FOREIGN PATENT DOCUMENTS

| | | |
|---|---|---|
| WO | 2008/091931 | 7/2008 |
| WO | 2011/023957 | 3/2011 |

OTHER PUBLICATIONS

G.T. Price Products, Inc., "Smoke-Cutter Flashlights", Aug. 20, 1987, 1 page.

(Continued)

*Primary Examiner* — Erin Kryukova
(74) *Attorney, Agent, or Firm* — Clement A. Berard, Esq.; Dann, Dorfman, Herrell & Skillman, PC

(57) ABSTRACT

An optical diffuser for a light may comprise an optical body having a substantially flat base at one end thereof and a complex lens structure at the opposing end thereof. The complex lens may have a plurality of curved optical surfaces and may produce a beam of light having a non-uniform light intensity. The optical diffuser may be attached to a light by a holder, and the holder may be movable on the light to place the optical diffuser in front of a light source.

17 Claims, 9 Drawing Sheets

Related U.S. Application Data

(60) Provisional application No. 61/950,470, filed on Mar. 10, 2014.

(56) References Cited

U.S. PATENT DOCUMENTS

| | | | |
|---|---|---|---|
| 6,598,998 B2 * | 7/2003 | West | H01L 33/58 257/E33.073 |
| 6,633,152 B2 | 10/2003 | Sharrah et al. | |
| 6,679,621 B2 | 1/2004 | West et al. | |
| 6,724,535 B1 | 4/2004 | Clabburn | |
| 7,168,839 B2 * | 1/2007 | Chinniah | F21K 9/00 362/296.01 |
| 7,222,995 B1 | 5/2007 | Bayat et al. | |
| D549,379 S | 8/2007 | Sharrah et al. | |
| 7,254,309 B1 | 8/2007 | Chou et al. | |
| 7,438,444 B2 | 10/2008 | Pao et al. | |
| 7,549,766 B2 | 6/2009 | Sharrah et al. | |
| 7,549,781 B2 | 6/2009 | Kim et al. | |
| 7,581,847 B2 | 9/2009 | Dalton | |
| 7,651,240 B2 | 1/2010 | Bayat et al. | |
| D611,629 S | 3/2010 | Sharrah et al. | |
| 7,745,957 B2 | 6/2010 | Bayat et al. | |
| 8,142,056 B2 | 3/2012 | Li | |
| 8,403,526 B2 | 3/2013 | Bayat et al. | |
| 8,633,641 B2 | 1/2014 | Lin | |
| 8,727,561 B2 | 5/2014 | Sharrah et al. | |
| 8,779,683 B2 | 7/2014 | Snyder et al. | |
| 9,080,735 B1 | 7/2015 | Cameron | |
| 9,294,660 B2 * | 3/2016 | O'Neill | H04N 5/2254 |
| 9,773,760 B2 * | 9/2017 | Keller | G02B 6/0036 |
| 1,003,084 A1 | 7/2018 | Worman et al. | |
| 2005/0185300 A1 * | 8/2005 | Kittelmann | F21V 3/04 359/742 |
| 2005/0225988 A1 | 10/2005 | Chaves et al. | |
| 2006/0013002 A1 | 1/2006 | Coushaine et al. | |
| 2006/0056175 A1 | 3/2006 | Petzl et al. | |
| 2006/0091429 A1 * | 5/2006 | Kim | G02B 19/0066 257/257 |
| 2007/0273984 A1 * | 11/2007 | Pao | G02B 19/0071 359/726 |
| 2008/0013325 A1 * | 1/2008 | Shiau | F21V 5/04 362/326 |
| 2008/0074886 A1 | 3/2008 | Chang | |
| 2009/0002992 A1 | 1/2009 | Dallas et al. | |
| 2009/0027876 A1 | 1/2009 | Yu | |
| 2009/0181729 A1 | 7/2009 | Griffin, Jr. et al. | |
| 2009/0237812 A1 * | 9/2009 | Tseng | G02B 13/0055 359/808 |
| 2010/0091485 A1 | 4/2010 | Matthews et al. | |
| 2010/0165633 A1 | 7/2010 | Moolman et al. | |
| 2010/0321931 A1 | 12/2010 | McDermott | |
| 2013/0100679 A1 * | 4/2013 | Lin | F21V 5/04 362/327 |
| 2013/0107109 A1 | 5/2013 | Yang | |
| 2013/0135871 A1 * | 5/2013 | Harooni | A45C 15/04 362/268 |
| 2015/0003081 A1 * | 1/2015 | Kobayashi | G02B 3/08 362/311.02 |
| 2015/0117028 A1 * | 4/2015 | Wang He | F21V 5/048 362/311.02 |
| 2015/0378215 A1 * | 12/2015 | Tran | F21V 5/04 362/97.3 |

OTHER PUBLICATIONS

G.T. Price Products, Inc., "Smoke Cutter", Fire Chief, Jul. 1989, 1 page.

G.T. Price Products, Inc., "The Professional Line with the Extras", Jan. 1991, 2 pages.

G.T. Price Products, Inc., "Code-4", prior to filing date Apr. 13, 2015, 1 page.

G.T. Price Products, Inc., "New Compact Headlamps", prior to filing date Apr. 13, 2015, 1 page.

U.S. General Services Administration, "Commercial Item Description, Marker Light, Personal Distress", Specification No. A-A-59176A, dated Jul. 7, 2004, 5 pages.

* cited by examiner

OPTICAL DIFFUSER FOR A PORTABLE LIGHT

This Application is a division of U.S. patent application Ser. No. 14/640,829 filed on Mar. 6, 2015, and entitled "PORTABLE LIGHT AND OPTICAL DIFFUSER THEREFOR" which claims the benefit of U.S. Provisional Patent Application No. 61/950,470 filed on Mar. 10, 2014, and entitled "PORTABLE LIGHT AND OPTICAL DIFFUSER THEREFOR," each of which is hereby incorporated herein by reference in its entirety.

The present invention relates to a portable light and to an optical diffuser therefor.

Portable lights are designed to provide light in a form generally suited to a particular use or application. Examples include a narrow or spot beam of light for illuminating a relatively small defined spot and a flood or broader beam of light for illuminating an area with a relatively uniform light intensity, and beams of light falling between those characterizations. Even a flood beam which may have a beam width of 45-90° seeks to provide a relatively uniform illumination over a somewhat limited area, albeit a much broader area than that illuminated by a spot beam.

In certain applications, e.g., those for military, rescue, police, fire and other first responder and/or dangerous and/or emergency situations, a beam of light having a particular beam characteristic may be desired. Such beams of light may require a very broad beam width, e.g., up to about 180°, and may also require a non-uniform distribution of light within the beam.

For example, the US General Services Administration has issued a specification No. A-A-59176A entitled "Commercial Item Description, Marker Light, Personal Distress" dated 7 Jul. 2004 which relates to certain personal distress marker lights that are useful in locating personnel who are in need of assistance in situations that may be hostile or otherwise dangerous, such as crew members of downed aircraft. That GSA specification defines the light intensity and beam width characteristics of the beam of light that such marker light is to produce, e.g., as in paragraph 2.2, Performance, thereof, and requires a beam of 180° width.

Applicant believes there may be a need for a portable light and an optical light diffuser therefor that can produce a beam of light having predetermined intensity and beam width characteristics, e.g., characteristics that may at least be similar to those set forth in the GSA specification A-A-59176A and/or in other specifications.

Accordingly, an optical diffuser may comprise an optical body having a substantially flat base at one end thereof and a complex lens at the opposing end thereof. The complex lens may have a plurality of curved optical surfaces and may produce a beam of light having a non-uniform light intensity. The optical diffuser may be attached to a light by a holder, and the holder may be movable on the light to place the optical diffuser in front of alight source.

According to another aspect, an optical diffuser and portable light may comprise: a housing; at least one light source emitting light from the housing; at least one switch; an optical diffuser movable over the housing to be placed in a position in front of the at least one light source for passing the light emitted thereby; the optical diffuser may have an optically clear body having a substantially flat base at an end proximate the at least one light source and having a complex lens structure at an end distal the at least one light source; and the complex lens may include a central conical recess and at least one raised annular surface having frustro-conical sloping sides.

According to a further aspect, an optical diffuser for a portable light may comprise: an at least partially cylindrical optically clear body having a substantially flat base at an end for receiving light from a light source and having a complex lens structure at an end distal the substantially flat base, and the at least partially cylindrical optically clear body defining a central axis between the substantially flat base and the complex lens; and the complex lens may include a central conical recess and at least one raised annular part defining a plurality of frustro-conical sloping side surfaces coaxial with the central axis and producing a beam of light having a broad beam width and a non-uniform intensity.

In summarizing the arrangements described and/or claimed herein, a selection of concepts and/or elements and/or steps that are described in the detailed description herein may be made or simplified. Any summary is not intended to identify key features, elements and/or steps, or essential features, elements and/or steps, relating to the claimed subject matter, and so is not intended to be limiting and should not be construed to be limiting of or defining of the scope and breadth of the claimed subject matter.

BRIEF DESCRIPTION OF THE DRAWING

The detailed description of the preferred embodiment(s) will be more easily and better understood when read in conjunction with the FIGURES of the Drawing which include.

Figure 1A:
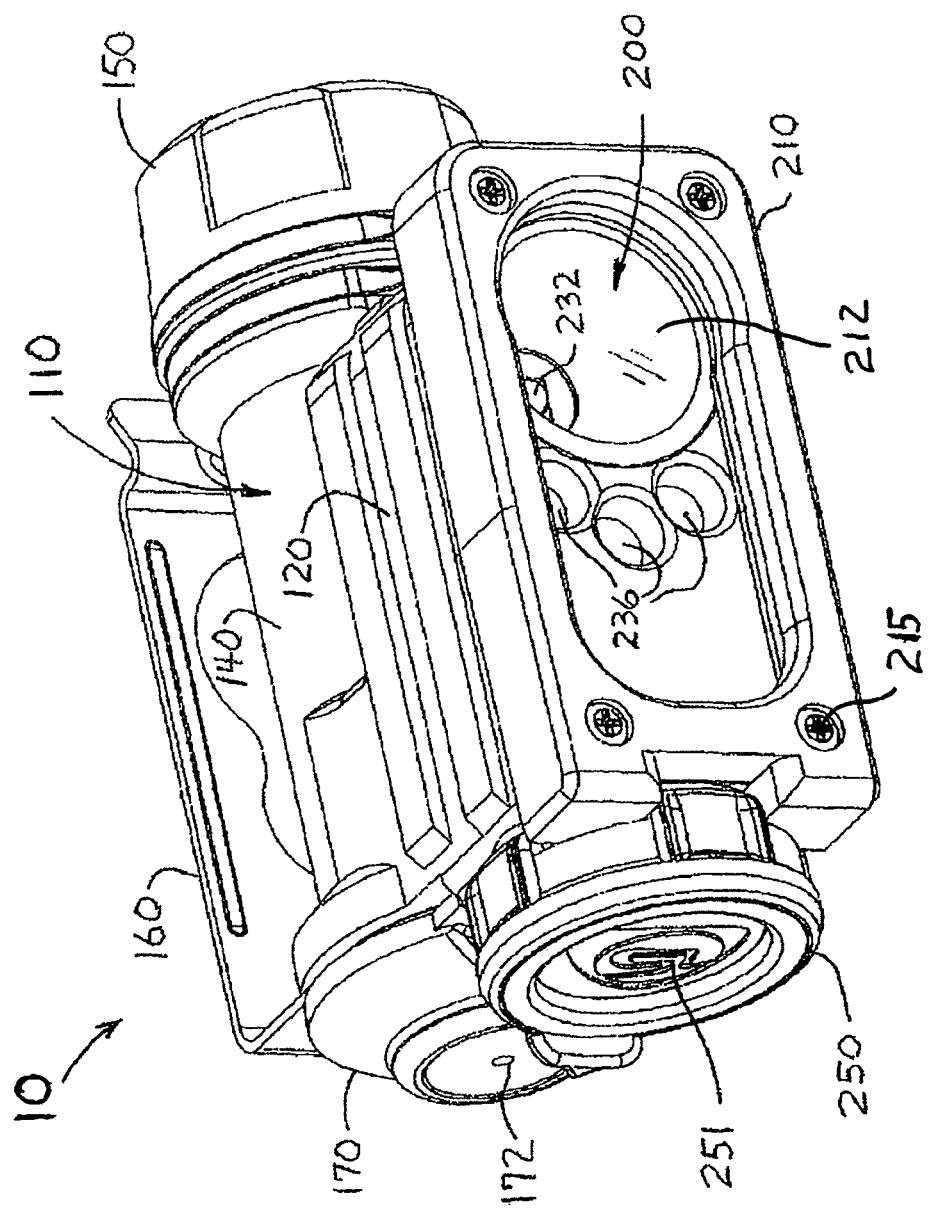
FIG. 1A is a perspective view of an example embodiment of a portable light and FIG. 1B is a perspective view of the example portable light having an example embodiment of a light optical diffuser according to the present arrangement associated therewith.

In the Drawing, where an element or feature is shown in more than one drawing figure, the same alphanumeric designation may be used to designate such element or feature in each figure, and where a closely related or modified element is shown in a figure, the same alphanumerical designation primed or designated "a" or "b" or the like may be used to designate the modified element or feature. Similarly, similar elements or features may be designated by like alphanumeric designations in different figures of the Drawing and with similar nomenclature in the specification. According to common practice, the various features of the drawing are not to scale, and the dimensions of the various features may be arbitrarily expanded or reduced for clarity, and any value stated in any Figure is given by way of example only.

DESCRIPTION OF THE PREFERRED EMBODIMENT(S)

Figure 1B:
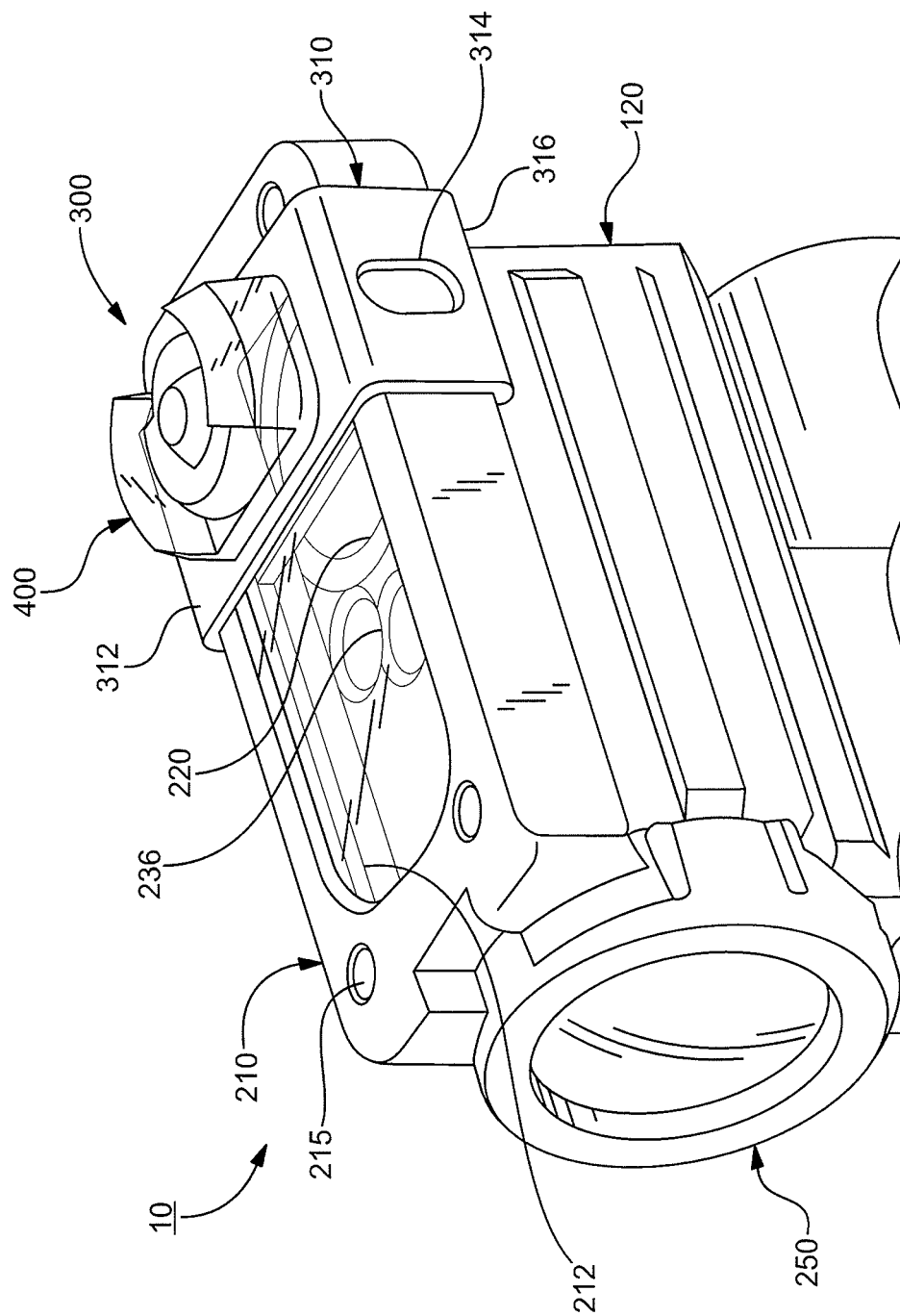

FIG. 1A is a perspective view of an example embodiment of a portable light 10 and FIG. 1B is a perspective view of the example portable light 10 having an example embodiment of a light optical diffuser 300 according to the present arrangement associated therewith. Light 10 may comprise a light housing 110 having a housing portion 120 and a housing portion 140. Housing portion 120 may be substantially rectangular and typically includes a light source assembly 200. Housing portion 120 resides adjacent a housing portion 140 which, e.g., may define a substantially cylindrical compartment 150 therein for receiving batteries of different types therein, as illustrated, or may be of any other suitable shape and size.

One example preferred light source assembly 200 includes a relatively higher light output light source 232 and one or more relatively lower light output light sources 236 which typically produce light having different properties, e.g. different colors and/or brightness. In one embodiment thereof, the primary light source 232 includes a white light emitting diode (LED) that produces light at a relatively higher brightness, while the other light sources 236 produce light a relative lower intensities. In one particular arrangement, the three light sources 236 may produce blue, red and infrared light while in another arrangement they may all produce green light, perhaps at different brightness levels, or any other desired combination of different colors and/or intensities of light.

A selector or knob 250 at one end of housing portion 120 is for selecting the one of light sources 232, 236 that is to produce light when light 10 is turned ON and for turning light 10 ON and OFF. To that end, selector 250 preferably is rotatable to select the particular light source 232, 236 to be operated by being pulled away from light body 110, 120 against a spring bias, rotated to a desired operating position indicative of a selected light source 232, 236, and then released to return toward body 100, 120 by the spring bias. Selector knob 250 preferably has a central push button actuator 251 that may be pressed to cause the selected light source 232, 236 to be turned ON and OFF, and further, preferably to select a particular operating mode, e.g., a brightness level, a continuous ON mode, a flashing mode, a blinking mode, and the like.

Body 110 typically has a tail cap 150 that covers the open end of its battery compartment, e.g., a compartment within housing portion 140, and may have a clip 160 by which light 10 may be attached to a person, an article and/or an object. Cap 150 may be tethered to housing portion 140 by a flexible connection or tether that allows cap 150 to be rotated relative to body 100. Clip 160 is preferably retained to body 100 by a clip cover 170 so as to be rotatable relative to body 100, whereby light produced by light 10 may be directed over a range of angular directions when light 10 is attached by clip 160. Cover 170 may include a vent port 172 for venting any pressure that might build up within body 100.

Light source assembly 200 is retained in housing or body portion 120 by a substantially rectangular face cap 210 and lens 212 which may be sealed by a lens gasket. Face cap or bezel 210 is retained on body portion 120 by plural fasteners 215, e.g., screws 215, but may be retained by any suitable fastening.

An optical diffuser assembly 300 is slidingly disposed on the face cap 210 including lens 212 so as to be slidable along the longer length of face cap 210, thereby to be slidable to cover and uncover none or one or more of light sources 232, 236. For example, when optical diffuser assembly 300 is slid to the right most position in FIG. 1B, optical diffuser assembly 300 covers light source 232 and its reflector, when optical diffuser assembly 300 is slid to a relatively central position in FIG. 1B, optical diffuser assembly 300 covers one or more of light sources 236 and substantially uncovers light source 232, and when optical diffuser assembly 300 is slid to the left most position in FIG. 1B, optical diffuser assembly 300 uncovers all of light sources 232, 236, e.g., a position whereat none of light sources 232, 236 are covered.

Optical diffuser assembly 300 includes a holder 310 and a light optical diffuser 400 residing in an opening thereof. Example holder 310 is substantially in a "C" shape defined by a longer central section 312 that rides along face cap 210 over lens 212, by two side sections 314 extending substantially perpendicularly from the opposing ends of central section 312, and two under sections 316 or tips 316 extending inwardly from the ends of side sections 314 distal from center section 312. Side sections 314 and tips 316 are configured to wrap around the long edges of face cap 210 in sliding engagement therewith, whereby optical diffuser assembly 300 is manually slidable along face cap 210.

Optical diffuser 400 has an optical diffuser body 410 that is substantially cylindrical with a diameter approximately the same as the width of lens 212 and reflector 220 of light source 232. The cylindrical body 410 has a pair of opposing substantially flat and parallel surfaces 420 on the side thereof and has a substantially flat base 412 on the end thereof that is disposed adjacent lens 212. Optionally, a pair of outwardly extending flanges 416 may be provided to fit in sliding engagement into respective grooves or slots 216 in an inner surface of the lens opening of face cap 210. A complex shaped lens 500 is provided on the exposed face of cylindrical optical diffuser body 410 that is opposite the base 412 thereof for forming light impinging on the base 412 thereof from light source 232 and/or 236 into a predetermined complex beam shape, e.g., one having a broad beam width and/or a non-uniform intensity.

While the example optical diffuser arrangement 300 may be configured and/or utilized in association with a variety of different portable lights, the example portable light 10 illustrated may be or may be similar to, e.g., a SIDE-WINDER® light or a SIDEWINDER COMPACT® light or a SIDEWINDER COMPACT® II light, each of which is commercially available in various models from Streamlight, Inc. located in Eagleville, Pa. Such example portable lights are described, e.g., in some or all of: U.S. Pat. No. 7,549,766 entitled "LIGHT INCLUDING AN ELECTRO-OPTICAL PHOTONIC SELECTOR SWITCH," U.S. Design Pat. D-549,379 entitled "PORTABLE LIGHT," and U.S. Design Pat. D-611,629 entitled "PORTABLE LIGHT," and in US Patent Publication 2012/0236551 entitled "LIGHT WITH COMPARTMENT ACCOMMODATING DIFFERENT BATTERIES," now issued as U.S. Pat. No. 8,727,561, each of which is hereby incorporated herein by reference in its entirety.

Figure 2A:
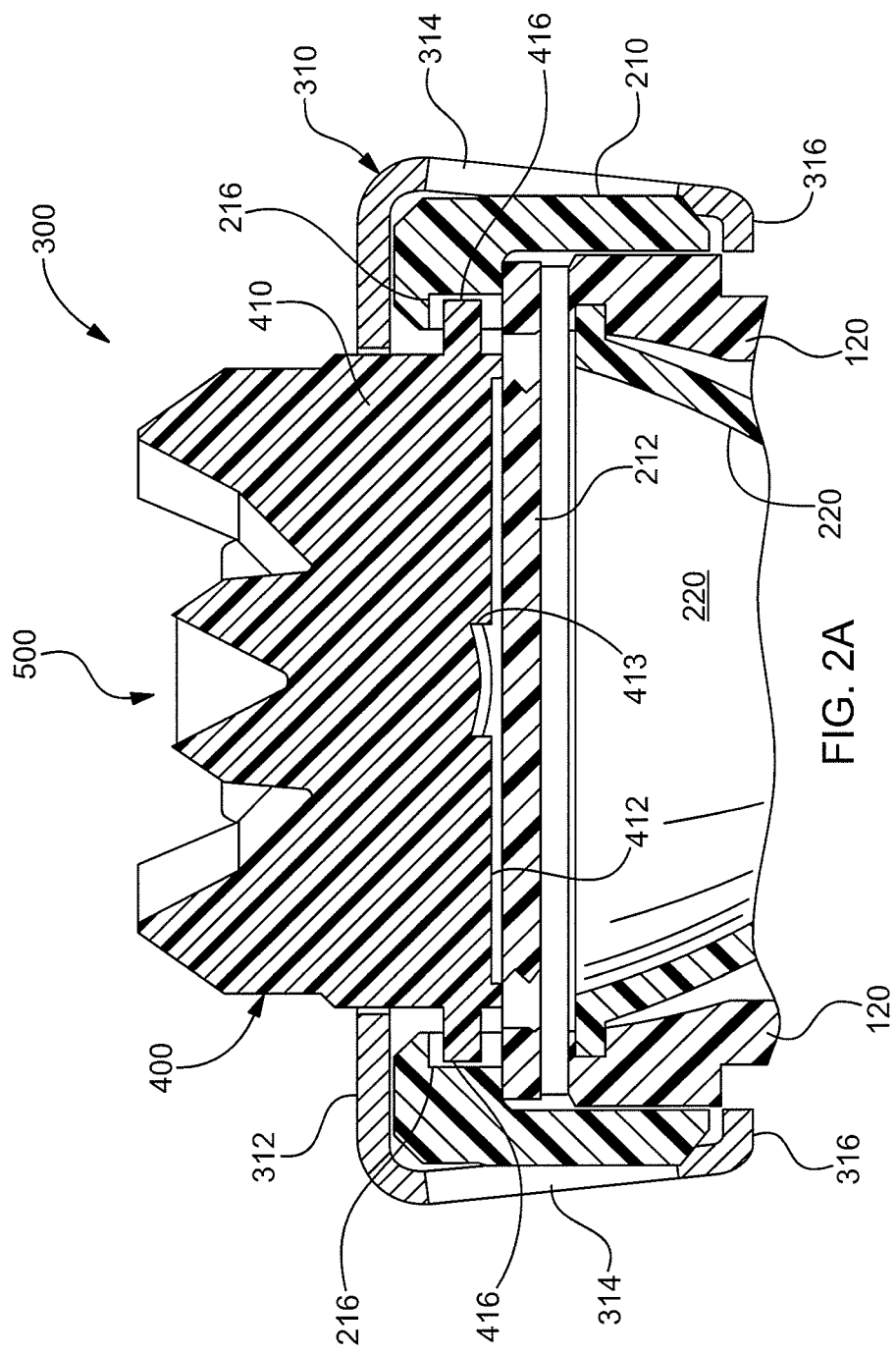
FIG. 2A is a cross-sectional view of a portion of the example light and light optical diffuser of FIG. 1 taken in a shorter crosswise direction and FIG. 2B is a cross-sectional view of a portion of the example light and light optical diffuser of FIG. 1 taken in a longer crosswise direction.
Figure 2B:
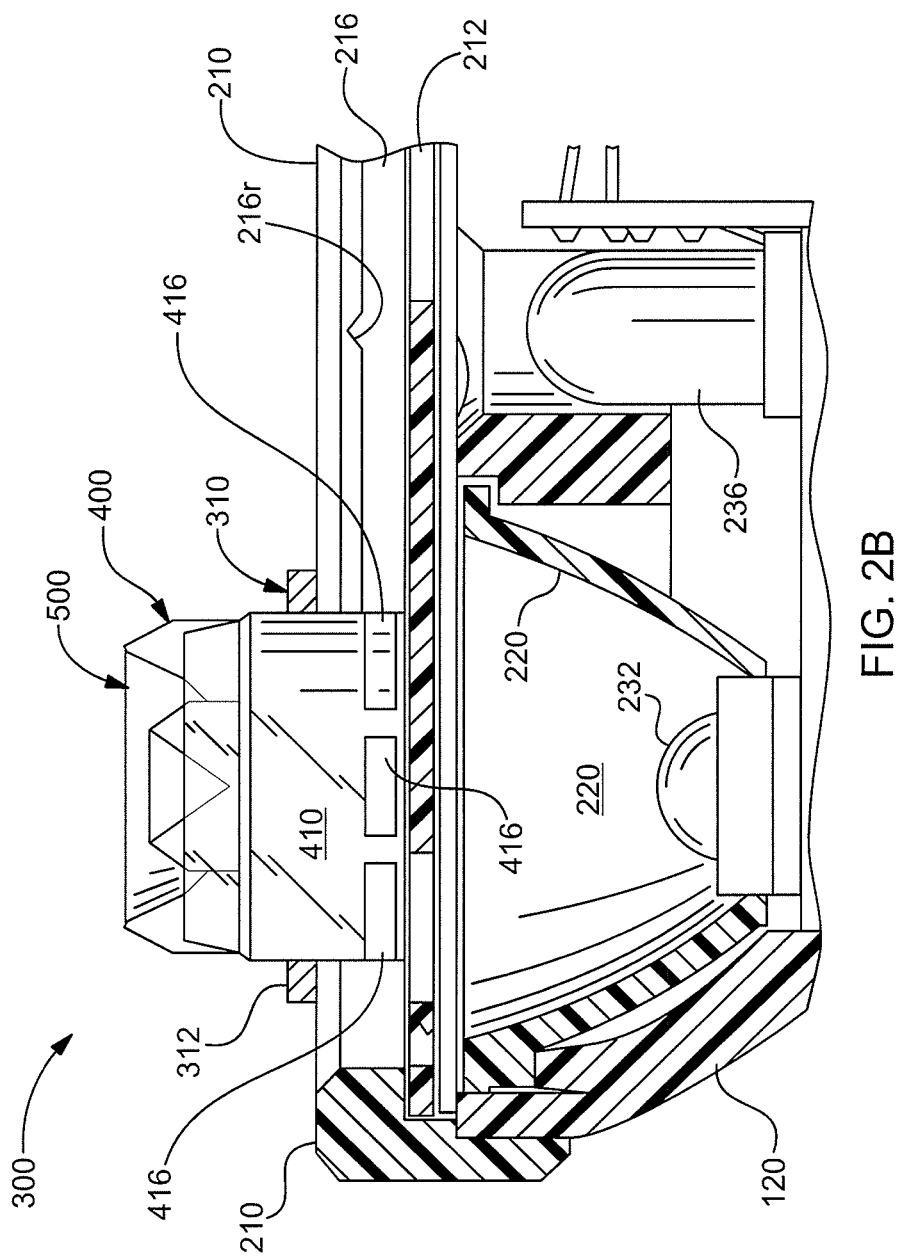

FIG. 2A is a cross-sectional view of a portion of the example light 10 and light optical diffuser 300 of FIG. 1 taken in a shorter crosswise direction, and FIG. 2B is a cross-sectional view of a portion of the example light 10 and light optical diffuser 300 of FIG. 1 taken in a longer crosswise direction. Therein is seen that the base end 412 of optical diffuser 400 is substantially parallel to and adjacent to lens 212 of light 10 so that light emitted by light sources 232 and/or 236 impinge substantially perpendicularly to base 412. Also seen is that flanges 416 of optical diffuser 400 extend outwardly to reside slidingly in opposing slots or grooves 216 of face cap 210, thereby to slidably position optical diffuser 400 relative to lens 212 and light sources 232, 236.

Further, it is also seen that the sides 314 and inward extending tips 316 of holder 310 extend from center section 312 thereof so as to wrap around the opposing sides of faceplate 120 and be slidable thereon. Holder 310 may be seen both as retaining optical diffuser 400 on face cap 120 of light 10 and as providing a convenient grip for grasping diffuser assembly 300 for sliding diffuser 400 in one direction and the other along face cap 120. The extremes of sliding travel of diffuser 400 may be limited by the body 410 thereof coming into contact with the shorter ends of the rectangular opening of face cap 120 in which optical diffuser 400 slides.

Light source 232 is seen to include, e.g., a light emitting diode 232 disposed at the base of a shaped reflector 220 which substantially forms the light emitted by LED 232 to be directed away from light 10, e.g., substantially perpendicularly to the faces of lens 212 and parallel to the central axis of reflector 220. The portion of the light emitted by LED 232 that is not directed outwardly is reflected by the internal surface of reflector 220 so as to be directed outwardly and substantially parallel to the central axes of reflector 220 and optical diffuser 400. The diameter of the body 410 of optical diffuser 400 is typically of approximately the same diameter as that of the larger open end of reflector 220, whereby substantially all of the light produced by LED 232 is directed to and through optical diffuser 400 when optical diffuser 400 is disposed opposite light source 232, e.g., as illustrated. Reflector 220 may be an axis symmetric parabolic reflector.

As described in further detail below, optical diffuser 400 and the complex lens 500 thereof produce a beam of light having a predetermined intensity profile relative to the central axes of reflector 220 and optical diffuser 400, which preferably are approximately aligned when diffuser 400 is employed.

Optical diffuser 400 may be moved, e.g., slid, so as to cover light source 236 which includes a light emitting diode 236 disposed in a cylindrical recess. LED 236 typically has a semi-spherical lens molded therewith, and both LED 236 and the cylindrical recess in which it is disposed are typically of smaller diameter than is the wide end of reflector 220. Base 412 of optical diffuser 400 preferably has a shaped lens surface 413 therein for receiving the light emitted by light source 236.

Shaped lens surface 413 preferably includes a circular portion of a substantially spherical surface, e.g., a convex surface as illustrated or a concave surface, and may be recessed in base 412 as illustrated. The diameter of the lens 413 is typically comparable to the diameter of LED 236 and the cylindrical recess in which it is disposed. Preferably, the lens of surface 413 in combination with the molded lens of LED 236 and the cylindrical surface of the recess in which LED 236 is disposed together shape the light emitted by LED 236 into a substantially parallel or slightly diverging beam inside the body 410 of optical diffuser 400.

In connection with installation of light diffuser assembly 300 onto an example portable light 10, assembly 300 would be assembled to faceplate 210 apart from the rest of light 10, in the process of assembly of light 10 or if after light 10 is assembled, then the face cap 210 would be removed and light diffuser assembly 300 would be installed thereon. Installation of diffuser assembly 300 typically involves the placing of the holder 310 onto faceplate 210 with the edges of faceplate 210 inside the sides and tips 314, 316 of holder 310, and then inserting diffuser body 410 into the opening of center part 312 of holder 310 from the rear of faceplate 210 with flanges 416 in grooves 216, followed by the placing of lens 212 and attaching faceplate 210 with diffuser assembly 300 thereon onto the housing 120 and the remainder of light 10.

Figure 3:
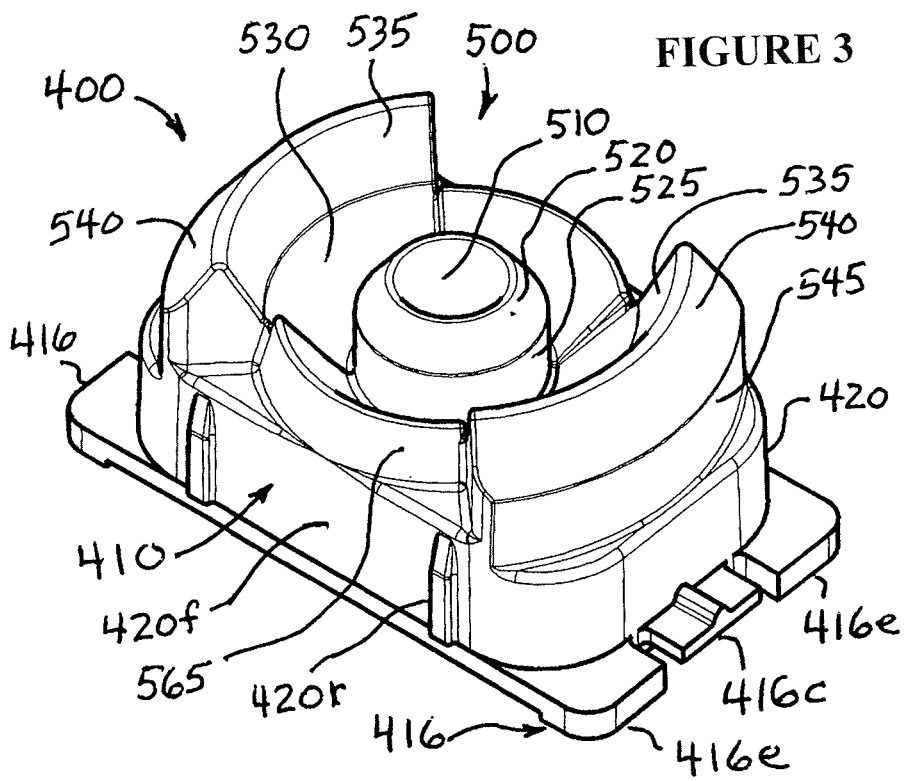
FIG. 3 is a perspective view of an example embodiment of an optical diffuser according to the present arrangement.
Figure 4A:
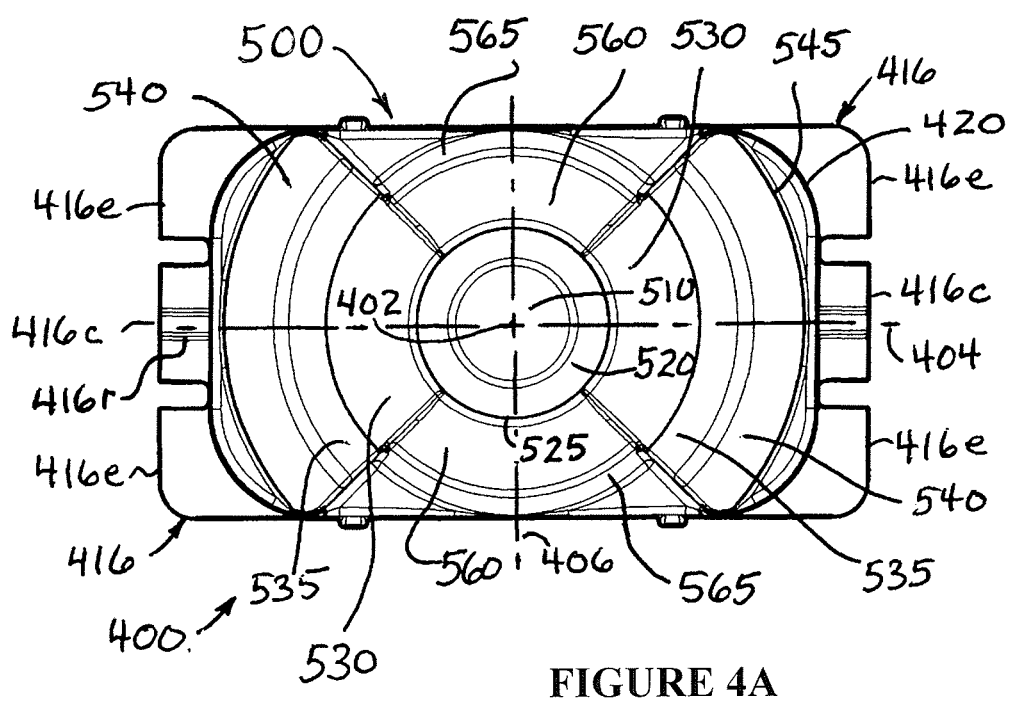
FIGS. 4A, 4B and 4C are top, first side and second side views, respectively, of the example optical diffuser of FIG. 3, and FIGS. 4D and 4E are cross-sectional views thereof corresponding to the view directions of FIGS. 4B and 4C, respectively.
Figure 4B:
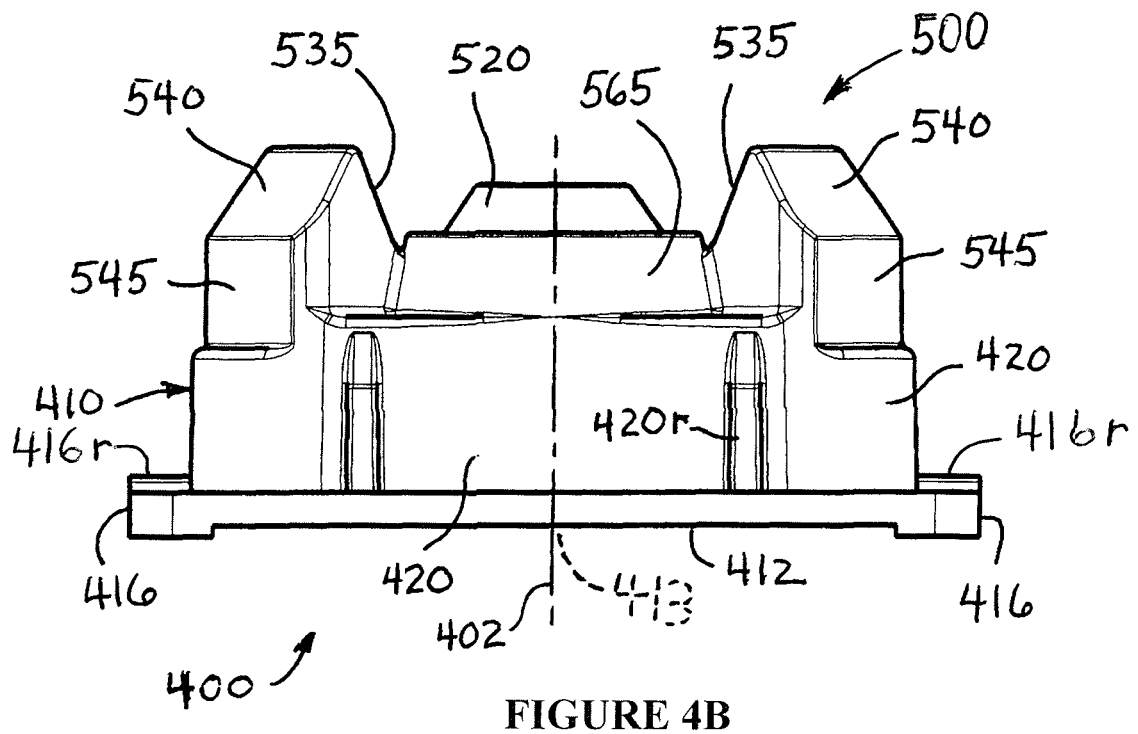
Figure 4C:
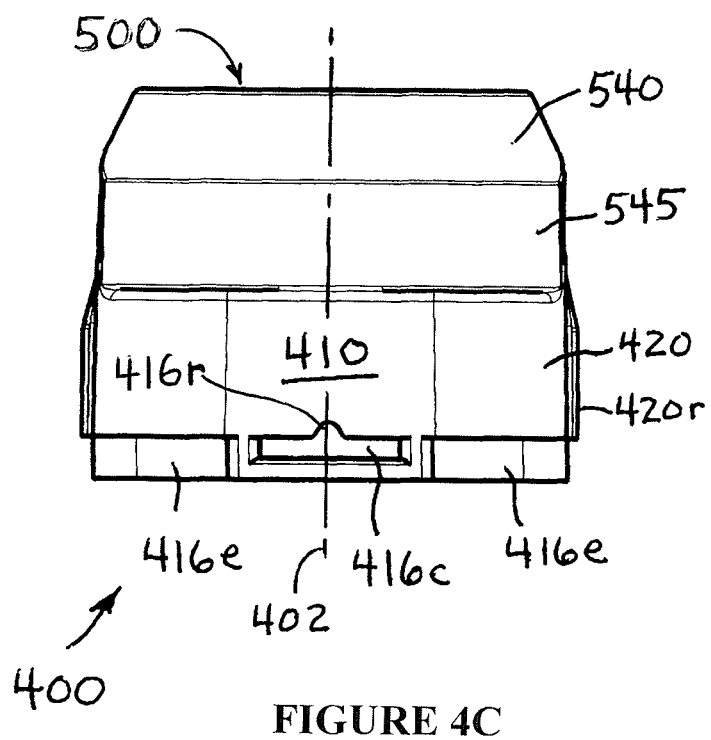
Figure 4D:
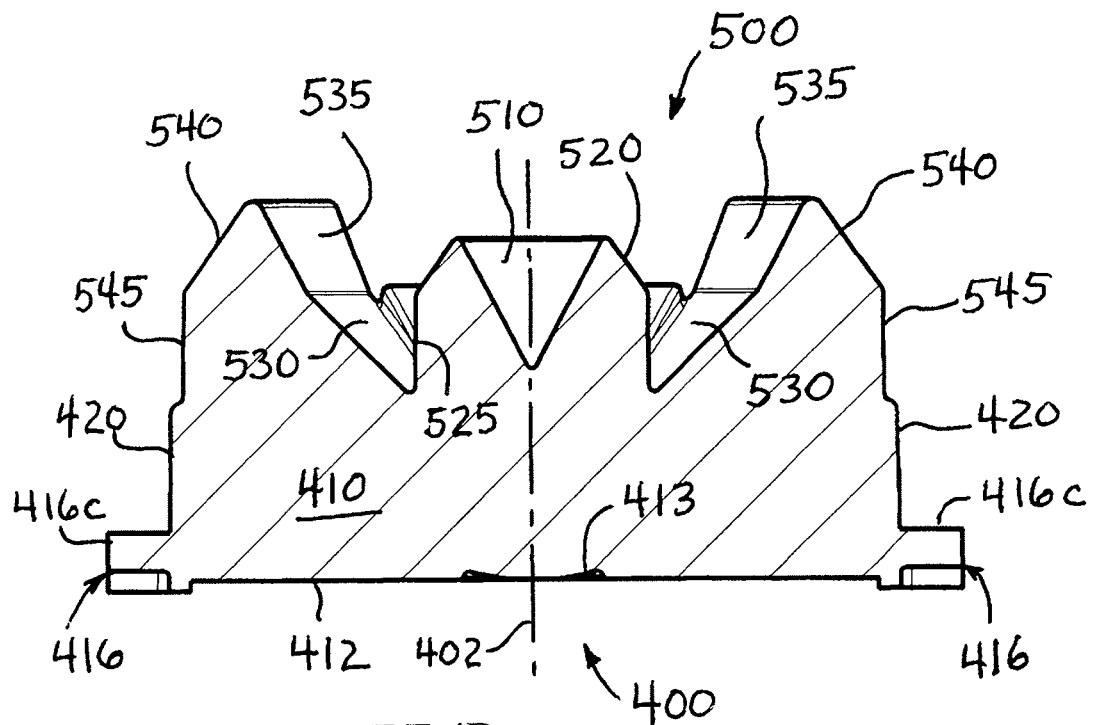
Figure 4E:
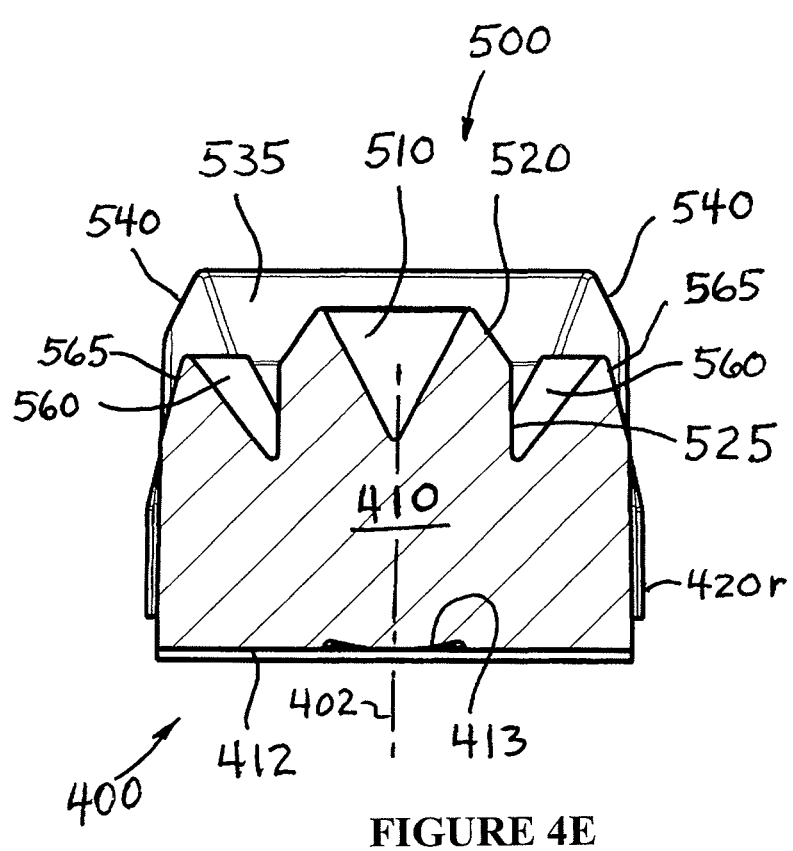

FIG. 3 is a perspective view of an example embodiment of an optical diffuser 400 according to the present arrangement; and FIG. 4 includes FIGS. 4A, 4B and 4C which are top, first side and second side views respectively, of the example optical diffuser 400 of FIG. 3, and FIGS. 4D and 4E which are cross-sectional views thereof corresponding to the view directions of FIGS. 4B and 4C, respectively.

Optical diffuser 400 is seen to have an optically clear substantially cylindrical body 410 that has a substantially flat base end 412 and a complex lens 500 at the opposite end thereof. The cross-sectional shape of body 410 at the base end 420 thereof may be substantially rectangular with curved corners substantially corresponding to the size and shape of the opening of face cap 210 in which it resides and slides and to the size and shape of the opening in center section 312 of holder 310 in which it resides. Flat sides 420f may have one or more raised features 420r for more tightly retaining rectangular end 420 in the corresponding opening therefor of center section 312 of holder 310. Flanges 416 extend outwardly from the circular ends of body 410 for slidingly engaging slots or grooves 216 of faceplate 120.

Flanges 416 may be simple flanges for retaining optical diffuser 400 on light 10. Preferably, however, each of flanges 416 has a central section 416c that is separated by a narrow gap from a pair of end sections 416e, and the end sections 416e thereof may be relatively thicker to provide stiffness while the center section 416c may be relatively thinner to provide flexibility, whereby friction between flanges 416e, 416c and slot or groove 216 of face cap 210 may provide a location retaining friction force for holding optical diffuser 400 in the position to which it is placed by a user.

Optionally, one of flanges 416, e.g., center flanges 416c, may have upward projections or ridges 416r that engage one or more corresponding recesses 216r in the top surface of groove 216, an example one of which is visible in FIG. 2B, thereby to provide a detent tending to maintain diffuser assembly 300 in predetermined locations on face cap 210, e.g., the positions at which optical diffuser 400 is properly located optically relative to light source 232, light source 236, or both, and optionally a storage position.

Preferably, three detents 216r, 416r, are provided: one each for the position of optical diffuser 400 directly in front of white light source 232, the position of optical diffuser 400 directly in front of IR light source 236, and the position of optical diffuser 400 where it is not in front of either white light source 232 or IR light source 236. Optical diffuser 400 may be considered to provide a "flash guard" feature when moved to the latter position and light is emitted from one of the non-centrally located LEDs 236, in particular, a side LED 236 that emits blue light.

Optical diffuser 400 and body 410 thereof have a central axis 402 that passes vertically through body 410 and have major and minor axes 404, 406 orthogonally intersecting axis 402 and corresponding to the longer and shorter horizontal dimensions, respectively, or body 410. The major axis 404 lies generally in the direction between center flanges 416c, and the minor axis 406 lies generally in the direction between flat sides 420f, with both major and minor axes 404, 406 intersecting at central axis 402.

Viewed from the top, as in FIG. 4A, diffuser body 410 is substantially symmetrical about both of the major and minor axes, as is complex lens 500 thereof, and all of the circular refracting and reflecting surfaces of complex lens 500 are centered about central axis 402. While the curved refracting surfaces of the example complex lens 500 of example optical diffuser 400 technically and geometrically include right circular sections of cones, and so are actually frustro-conical, they may be referred to herein as circular and/or curved refracting surfaces for simplicity and convenience. The central axis of each frustro-conical surface forming a part of example complex lens 500 is coaxial with central axis 402. It is noted that the surfaces do not need to be frustro-conical nor do their central axes necessarily need to be coaxial.

The inner frustro conical sections and surfaces 510-525 are fully circular while the outer frustro-conical sections are segmented into plural sections. The segmentation of surfaces 530-560 is approximately into quadrants, e.g., four quadrants of about 90° each, with the segmentation being offset by about 45° from major and minor axes 404, 406 opposing segments being substantially identical. These plural segmented sections facilitate providing a greater number of frustro-conical surfaces which can be at different angles relative to central axis 402 thereby to permit greater dispersion (by reflection and refraction by surfaces 510-565) of the light emanating from light source 232 in an increased number of defined directions. The segmented surfaces 530-560 are necessarily smaller in area than completely circular surfaces would be, and so the amount of light passing through each one is a smaller proportion of the total light intensity or flux. This arrangement is seen to facilitate the redirecting (e.g., diffusing) of the light from light source 232, 236 into a complex pattern that can at least satisfactorily approximate a complex light beam intensity specification.

The various surfaces of complex lens 500 may serve as reflective surfaces, e.g., as total internal reflection (TIR) surfaces, as refractive surfaces, e.g., as light entry surfaces and/or light exit surfaces, or as any combination thereof, with respect to different ones of the rays of light emanating from the light source 232, 236 of light 10, e.g., depending upon where over the area of entry surface 412 at the base 412 of diffuser 400 the light rays enter optical diffuser 400. Various combinations of surfaces 510-565 of complex lens 500 serve to receive light emanating from light source 232, 236, which emanates for the most part as a focused beam with substantially parallel rays, and to redirect and disperse ones of those light rays in various directions, e.g., principally by TIR reflection, so as to exit from ones of surfaces 510-565 of diffuser 400 in different predetermined directions in proportions approximating a desired specification of relative light intensity, e.g., a light beam having a broad beam width and/or a non-uniform intensity.

In one example complex lens 500, the reflecting and refracting surfaces 510-565 are provided at angles, sizes and spacings to produce a defined beam having specified minimum angular beam coverage light intensity characteristics generally corresponding to Table I, "Minimum angular beam coverage light intensity," of GSA Specification A-A-59176A which are reiterated in Table I below. The column of Table I entitled "Percent of Peak Intensity" is added and is not part of the table of the GSA specification.

TABLE I

| Angular Beam Coverage (Long & Short Axis of Lens) | Effective Intensity | Percent of Peak Intensity |
| --- | --- | --- |
| 40° (20° each side of lens zenith) | 1.80 | 100% |
| 110° (55° each side of lens zenith) | 0.95 | 53% |
| 150° (75° each side of lens zenith) | 0.65 | 36% |
| 180° (90° each side of lens zenith) | 0.65 | 36% |
| Head-on intensity | 1.80 | 100% |

Figure 5A:
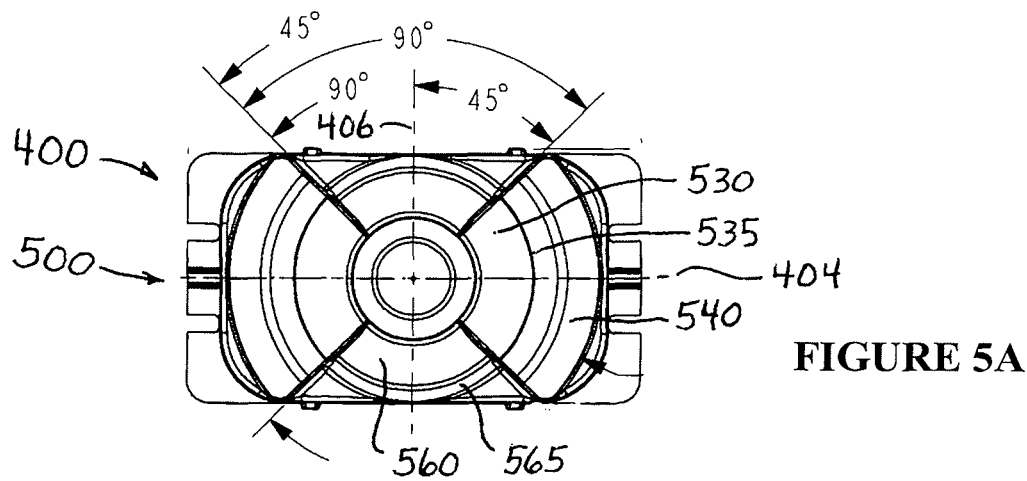
FIGS. 5A, 5B and 5C correspond to FIGS. 4A, 4D and 4E with the angular dimensions of various ones of the optical surfaces annotated.
Figure 5B:
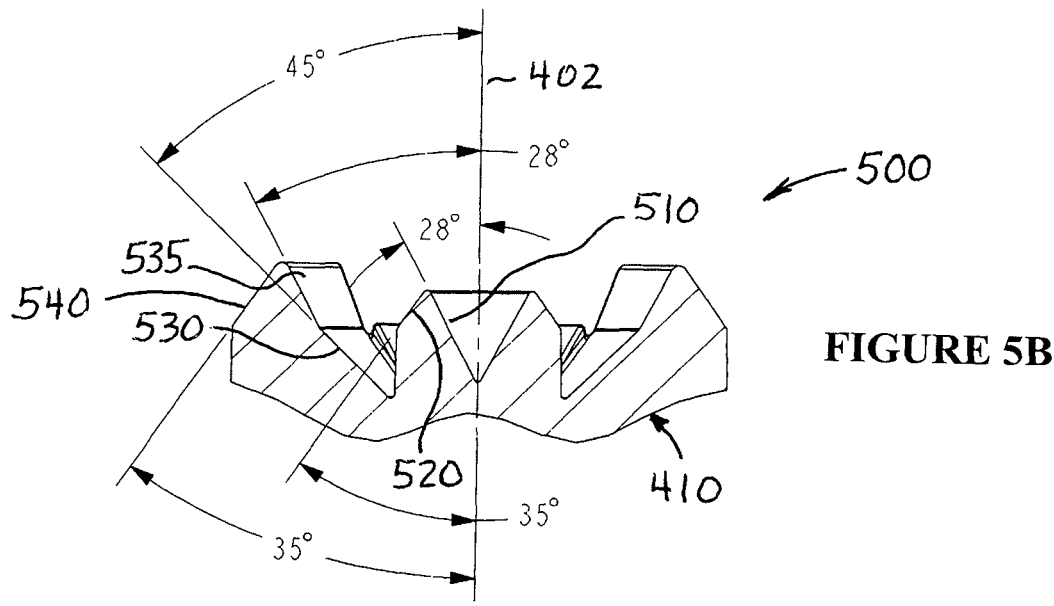
Figure 5C:
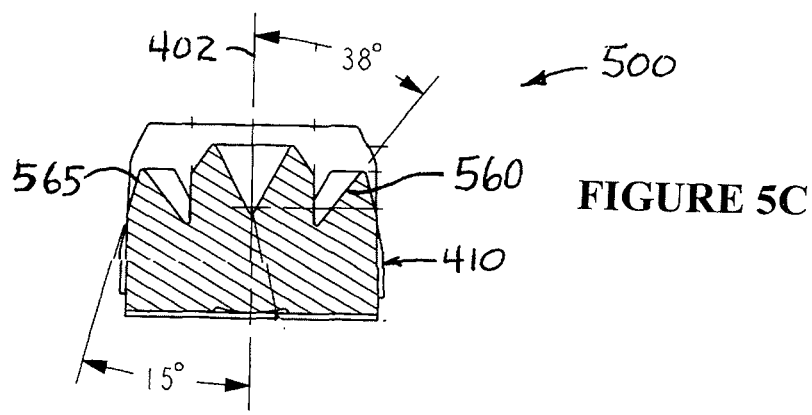
Figures 6A, 6B:
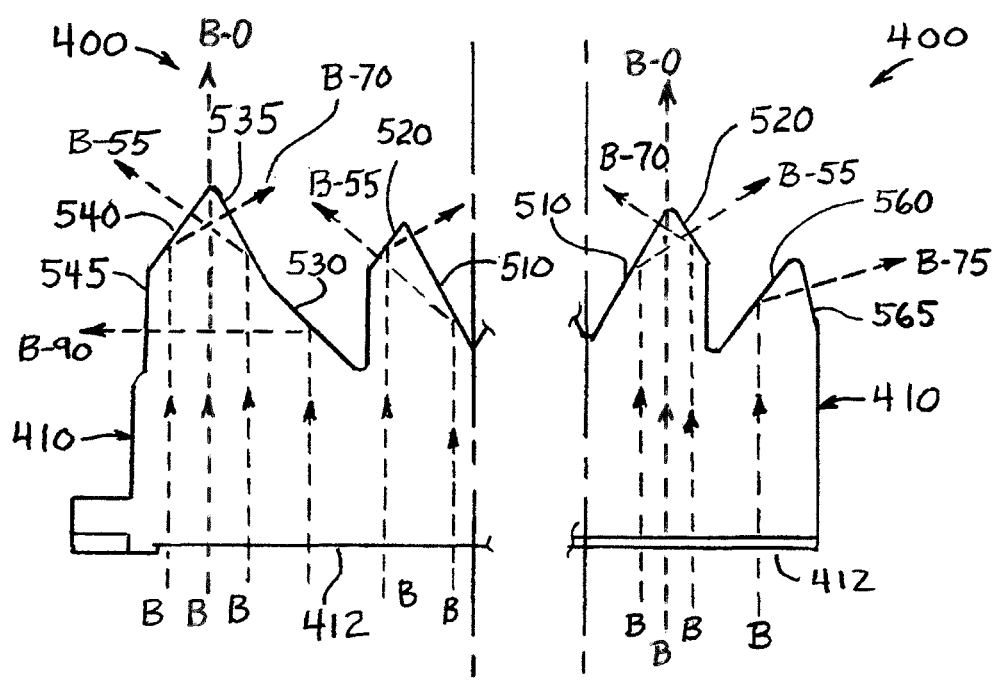
FIGS. 6A and 6B are schematic diagrams illustrating paths of example light rays passing through and being directed by the example optical diffuser of FIG. 3.

FIGS. 5A, 5B and 5C correspond to FIGS. 4A, 4D and 4E with the angular dimensions for various ones of the optical surfaces 510-565 annotated, and FIGS. 6A and 6B are schematic diagrams illustrating paths of example light rays passing through and being directed by the example optical diffuser 400 of FIG. 3 which is in an example configuration for approximating the angular beam light intensity pattern of Table I above. Because optical diffuser 400 is symmetrical about its central axis 402, only half of each of the orthogonal cross-sections thereof are illustrated in FIGS. 6A and 6B.

The beams or rays of light B from LED light sources 232, 236 enter the optically clear body 410 of optical diffuser 400 through entry surface 412 at the base thereof. Beams B are typically substantially parallel to each other and enter body 410 substantially perpendicularly to base surface 412, however, some of beams B, typically and preferably a relatively small percentage thereof, may not be parallel, e.g., due to the emission pattern of LED 232 and/or LED 236, the positioning of LED 232 in reflector 220, and other tolerances and departures from an ideal configuration.

The cone angles and half cone angles for frustro-conical optical surfaces 510-565 and the beam angles for beams B20-B90, all relative to central axis 402, which is sometimes referred to as "lens zenith," are set forth in Table II below.

TABLE II

| OPTICAL SURFACE | CONE ANGLE | HALF-CONE ANGLE | BEAM & ANGLE | EXIT SURFACE |
| --- | --- | --- | --- | --- |
| 510 | 55° | 28° | B-55 @ 55° | 520 |
| 520 | 70° | −35° | B-70 @ 70° | 510 |
| 525 | 0° | 0° | — | — |
| 530 | 90° | 45° | B-90 @ 90° | 545 |
| 535 | 55° | 28° | B-55 @ 55° | 540 |
| 540 | 70° | 35° | B-70 @ 70° | 535 |
| 545 | 0° | 0° | — | — |
| 560 | 75° | 38° | B-75 @ 75° | 565 |
| 565 | 30° | −15° | — | — |

In general, exit surfaces are refractive and preferably the beams of light exiting therefrom exits substantially perpendicularly to the exit surface, however, if such beam of light should be off from perpendicular, the refractive nature of the exit surface from diffuser 400 will tend to refract such beam away from a perpendicular angle. Surfaces 420, 420f, 525 and 545 serve as TIR surfaces to direct light that may not be parallel to central axis 402 to reflective and refractive surfaces 510-565 so that such light is directed outward from optical diffuser 400 and contribute to the intensity of the light beam produced thereby.

Annular surfaces at the apexes (circular segments) at the top of complex lens 500 and in the valleys of complex lens 500, e.g., the peaks and valleys formed by intersections of frustro-conical optical surfaces, are curved and so light exiting therethrough will tend to exit in a direction substantially parallel to or closely parallel to central axis 402, thereby to provide light intensity that is on-axis and slightly off axis, e.g., within the ±20° light intensity cone. Light passing through the annular surfaces between frustro-conical surfaces 535, 540 and through the curved apex at the bottom of conical surface 510, and to a lesser extent through the curved apexes between surfaces 560, 565, provide light intensity in close to a substantially on-axis direction, e.g., substantially parallel to central axis 402. In addition, light from light source 232 that exits reflector 220 and lens 212 is substantially parallel to central axis 402 and passes parallel to side surfaces 420f of diffuser 400 to also contribute to the on-axis light intensity.

The directions in which light is directed by the various optical surfaces 510-565 of optical diffuser 400 may be varied by selecting the predetermined cone angles thereof in accordance with a desired or specified beam light intensity distribution. Where $A_T$ is a specified target angular beam coverage (as in Table I above) and $A_S$ is the half cone angle of a frustro-conical surface, e.g., the angle of the frustro-conical reflecting surface relative to the central axis 402, then the half cone angle $A_S$ may be calculated by: $A_S=A_T/4$ and the angle of the frustro-conical exit surface relative to the central axis 402 as in the present example where the light is desired to exit perpendicularly to an exit surface, may be calculated by: $A_S=(A_T/2)\pm 90°=2A_S+90°$. A light beam having light emanating at angles of about ±55° (i.e. a beam width of about 110°) or greater relative to a central axis may be defined as having a broad beam width.

The beam pattern produced by optical diffuser 400 includes light exiting at ±90° to central axis 402 and exiting parallel to central axis 402 and exiting at essentially all angles in between, and so optical diffuser 400 produces an optical beam having an about 180° beam width. This about 180° width beam is produced by diffuser 400 from light exiting reflector 220 that is essentially a spot beam with a relatively narrow beam angle, to produce therefrom a light beam having a broad beam width.

The convex lens 413 in base 412 of optical diffuser body 410 is provided to refract light emitted directly from LED 232 or 236 which may not be a collection of parallel rays, but which may be diverging rays centered on axis 402. Convex lens 413 refracts this light to be more closely parallel so that it illuminates reflecting surfaces 510-565, and particularly the more central reflecting surfaces 510-520, with the intended incident angles so as to be reflected and exit light body 410 in the intended directions as described.

The relative intensity of light beams produced by the various internally reflective and refractive surfaces can be varied by increasing and decreasing the relative areas thereof and by extending and collapsing the axial length of complex lens 500, e.g., by lengthening and shortening of surface 525. In particular, the intensity of light will generally be proportional to the area of the reflective (TIR) surfaces 510-565 of optical body 410, and the size and area of the exit surfaces may be determined once the size and area of the respective reflective (TIR) surfaces are determined. Preferably, the viewing angle FWHM (full width at half maximum) and intensity across the entire spectral distribution of the light emitted by the light source 232, 236 should be taken into account.

In summary, while many if not most portable lights are configured to provide a controlled, focused beam of light, e.g., a spot beam or a flood beam, wherein the light is substantially parallel to or somewhat divergent from an optical axis, the novel optical diffuser 400 described herein when employed in conjunction with such light can reform the beam of light produced thereby into a more widely diffuse beam of light according to desired light intensity specifications. As a result, the portable light in combination with the optical diffuser becomes useful for additional purposes, e.g., producing a very broad beam of light such as for a personnel locator beacon. The beacon light may be in the visible spectrum, e.g., as produced by a white emitting LED 232 or by a red, green or blue emitting LED 236, or in the infrared (IR) spectrum, e.g., as produced by an IR LED 236.

In a typical embodiment, optical diffuser 400 has a body of an optically clear material, e.g., a glass, polycarbonate, polystyrene, acrylic, or another suitable clear plastic, and holder 310 may be of a metal, e.g., a steel, aluminum or brass, or a plastic of suitable strength and rigidity. Preferred optical materials for optical diffuser 400 have an index of refraction of about 1.5 and desirable optical properties for transmission, reflection and absorption of light in the bands of interest. In one typical embodiment intended for use with a Streamlight SIDEWINDER light, the optical body 410 of optical diffuser 400 is about 0.67 inch (about 17 mm) along its major axis, about 0.44 inch (about 11.2 mm) along its minor axis, and about 0.36 inch (about 9.0 mm) in height. The angles of surfaces 510-565 thereof relative to central axis 402 are approximately the half-cone angels as set forth in Table II above.

An optical diffuser 400 and portable light 10 may comprise: a housing 110, 120 having a cavity for a source of electrical power; at least one light source 232, 236 emitting light from a face of the housing 110, 120; at least one control switch 250, 251 for selectively energizing the at least one light source 232, 236; an optical diffuser 400 movable over the face of the housing 110, 120 from which the at least one light source 232, 236 emits light, the optical diffuser 400 being movable to be placed in a first position in front of the at least one light source 232, 236 for passing the light emitted thereby and to be placed in a second position not in front of the at least one light source 232, 236; the optical diffuser 400 having an at least partially cylindrical optically clear body having a substantially flat base at an end proximate the at least one light source 232, 236 and having a complex lens structure 500 (e.g., a complex lens 500) at an end distal the at least one light source 232, 236; the complex lens structure 500 may include a central conical recess and at least one raised annular surface having frustro-conical sloping sides. The face of the housing 110, 120 may be substantially rectangular and the optical diffuser 400 is slidingly movable on the rectangular face to be placed in the first position in front of the at least one light source 232, 236 for passing the light emitted thereby and to be placed in the second position not in front of the at least one light source 232, 236. The optical diffuser 400 may include: a holder 300 for slidingly engaging the face of the housing 110, 120; or opposing flanges for slidingly engaging the face of the housing 110, 120; or a holder 300 and opposing flanges for slidingly engaging the face of the housing 110, 120. The at least one light source 232, 236 may include at least two light sources 232, 236 emitting light at different optical wavelengths. One of the least two light sources 232, 236 may emit visible light when energized and another of the at least two light sources 232, 236 may emit infrared light when energized, wherein the optical diffuser 400 is movable to be placed in a position in front of the visible light source 232, 236 for passing the visible light emitted thereby and to be placed in a position in front of the infrared light source 232, 236 for passing the infrared light emitted thereby. The at least one light source 232, 236 may include a shaped curved reflector 220 having a base end and a wide end, and a visible light emitting light emitting diode 232 at the base end of the reflector, wherein the optical diffuser 400 is movable to a position whereat its base end is proximate the wide end of the reflector 220 for receiving light emitted by the visible light emitting diode 232. The optical diffuser 400 and portable light 10 may further comprise a holder 300 movable on the housing 110, 120, wherein the optical diffuser 400 is retained by the holder 300 to be movable on the housing 110, 120. The holder 300 may have a "C" shape with the distal ends of the C-shaped holder 300 movably engaging the housing 110, 120; or the optical diffuser 400 may include at least one flange for movably engaging a groove of the housing 110, 120; or the holder 300 may have a "C" shape with the distal ends of the C-shaped holder 300 movably engaging the housing 110, 120 and the optical diffuser 400 may include at least one flange for movably engaging a groove of the housing 110, 120. The beam of light leaving the complex lens structure 500 may include light emanating at a half-cone angle of about 55° or greater relative to a central axis of the complex lens structure 500.

An optical diffuser 400 and portable light 10 may comprise: a housing 110, 120 having at least one light source 232, 236 emitting light; at least one control switch 250, 251 for selectively energizing the at least one light source 232, 236; an optical diffuser 400 proximate the housing 110, 120 from which the at least one light source 232, 236 emits light, the optical diffuser 400 being in a position in front of the at least one light source 232, 236 for passing the light emitted thereby; the optical diffuser 400 having an at least partially cylindrical optically clear body having a substantially flat base at an end proximate the at least one light source 232, 236 and having a complex lens structure 500 (e.g., a complex lens 500) at an end distal the at least one light source 232, 236; the complex lens structure 500 may include a central conical recess and at least one raised annular surface having frustro-conical sloping sides producing a beam of light having a broad beam width and a non-uniform intensity. The face of the housing 110, 120 may be substantially rectangular and the optical diffuser 400 is slidingly movable on the rectangular face to be placed in the first position in front of the at least one light source 232, 236 for passing the light emitted thereby and to be placed in the second position not in front of the at least one light source 232, 236. The optical diffuser 400 may include: a holder 300 for slidingly engaging the face of the housing 110, 120; or opposing flanges for slidingly engaging the face of the housing 110, 120; or a holder 300 and opposing flanges for slidingly engaging the face of the housing 110, 120. The at least one light source 232, 236 may include at least two light sources 232, 236 emitting light at different optical wavelengths. One of the least two light sources 232, 236 may emit visible light when energized and another of the at least two light sources 232, 236 may emit infrared light when energized, wherein the optical diffuser 400 is movable to be placed in a position in front of the visible light source 232, 236 for passing the visible light emitted thereby and to be placed in a position in front of the infrared light source 232, 236 for passing the infrared light emitted thereby. The at least one light source 232, 236 may include a shaped curved reflector 220 having a base end and a wide end, and a visible light emitting light emitting diode 232 at the base end of the reflector 220, wherein the optical diffuser 400 is movable to a position whereat its base end is proximate the wide end of the reflector 220 for receiving light emitted by the visible light emitting diode 232. The optical diffuser 400 and portable light 10 may further comprise a holder 300 movable on the housing 110, 120, wherein the optical diffuser 400 is retained by the holder 300 to be movable on the housing 110, 120. The holder 300 may have a "C" shape with the distal ends of the C-shaped holder 300 movably engaging the housing 110, 120; or the optical diffuser 400 may include at least one flange for movably engaging a groove of the housing 110, 120; or the holder 300 may have a "C" shape with the distal ends of the C-shaped holder 300 movably engaging the housing 110, 120 and the optical diffuser 400 may include at least one flange for movably engaging a groove of the housing 110, 120. The beam of light leaving the complex lens structure 500 may include light emanating at a half-cone angle of about 55° or greater relative to a central axis of the complex lens structure 500.

An optical diffuser 400 for a portable light 10 may comprise: an at least partially cylindrical optically clear body 410 having a substantially flat base 412 at an end for receiving light from a light source 232, 236 and having a complex lens structure 500 (e.g., a complex lens 500) at an end distal the substantially flat base, the at least partially cylindrical optically clear body 410 defining a central axis 402 between the substantially flat base and the complex lens structure 500; the complex lens structure 500 may include a central conical recess 510 and at least one raised annular part 510-565 defining a plurality of frustro-conical sloping side surfaces 510-565 coaxial with the central axis and producing a beam of light having a broad beam width and a non-uniform intensity. The complex lens structure 500 may comprise: a side surface of the at least partially cylindrical optically clear body 410 providing a first optical exit surface; a first internally reflective frustro-conical surface for directing light through the first optical exit surface; a second frustro-conical surface defining a second optical exit surface; and the central conical recess defining an internally reflective conical surface for directing light through the second optical exit surface. The complex lens structure 500 may further comprise: a third frustro-conical surface defining a third optical exit surface; and a third internally reflective frustro-conical surface for directing light through the third optical exit surface. The complex lens structure 500 may comprise: a first frustro-conical surface defining a first optical exit surface; and a first internally reflective frustro-conical surface for directing light through the first optical exit surface. The first internally reflective frustro-conical surface may define a second optical exit surface; and the first frustro-conical surface directs light through the second optical exit surface. The frustro-conical surfaces 510-565 of the complex lens structure 500 may comprise: a frustro-conical surface 510-565, a parabolic surface 510-565, a hyperbolic surface 510-565, a concave surface 510-565, a convex surface 510-565, or a plurality of flat facets 510-565, or a combination thereof. The substantially flat base 412 may have a convex lens 413 at a part thereof proximate the central axis 402. The substantially flat base 412 may have a recessed convex surface 413 proximate the central axis 402. The beam of light leaving the complex lens structure 500 may include light emanating at a half-cone angle of about 55° or greater relative to a central axis of the complex lens structure 500. The beam of light produced by the complex lens structure 500 may include light emanating at a half-cone angle of about 55° or greater relative to a central axis of the complex lens structure 500. The beam of light produced by the complex lens structure 500 may include light emanating at half-cone angles of about 0°, about 55°, about 70° or 75°, and about 90° relative to a central axis of the complex lens structure 500.

As used herein, the term "about" means that dimensions, sizes, formulations, parameters, shapes and other quantities and characteristics are not and need not be exact, but may be approximate and/or larger or smaller, as desired, reflecting tolerances, conversion factors, rounding off, measurement error and the like, and other factors known to those of skill in the art. In general, a dimension, size, formulation, parameter, shape or other quantity or characteristic is "about" or "approximate" whether or not expressly stated to be such. It is noted that embodiments of very different sizes, shapes and dimensions may employ the described arrangements.

Although terms such as "up," "down," "left," "right," "up," "down," "front," "rear," "side," "end," "top," "bottom," "forward," "backward," "under" and/or "over," "vertical," "horizontal," and the like may be used herein as a convenience in describing one or more embodiments and/or uses of the present arrangement, the articles described may be positioned in any desired orientation and/or may be utilized in any desired position and/or orientation. Such terms of position and/or orientation should be understood as being for convenience only, and not as limiting of the invention as claimed.

The term battery is used herein to refer to an electrochemical device comprising one or more electro-chemical cells and/or fuel cells, and so a battery may include a single cell or plural cells, whether as individual units or as a packaged unit. A battery is one example of a type of an electrical power source suitable for a portable device. Other devices could include fuel cells, super capacitors, solar cells, and the like. Any of the foregoing may be intended for a single use or for being rechargeable or for both.

While the present invention has been described in terms of the foregoing example embodiments, variations within the scope and spirit of the present invention as defined by the claims following will be apparent to those skilled in the art. For example, optical diffuser 400 could have a cylindrical body 410 having a diameter suitable for being used with a circular light and lens. Further, diffuser 400 could be retained by a holder 310 that provides a pivoted or hinged mounting so that optical diffuser 400 may be pivoted or rotated into and out of position in front of the circular light and lens.

The optically reflective and refractive surfaces 510-565 described in the example embodiment as being frustroconical surfaces, may have other geometric characteristics. For example, they may include parabolic surfaces 510-565, hyperbolic surfaces 510-565, concave surfaces 510-565, convex surfaces 510-565, or even a plurality of flat facets 510-565, or a combination thereof, as may be employed in a given embodiment, and such variations are intended to be included by the term frustro-conical herein. Accordingly, a diffuser 400 may provide a light beam including light emanating at some or all the angles described herein or at one or more different angles.

Optical diffuser 400 need not have a flange 416 that engages a slot or groove of light 10 as illustrated, but may be retained by a holder, e.g., similar to holder 312 or another holder, that is attachable to a light in a desired manner for permitting diffuser 400 to be placed in front of its light source, either movably or permanently.

While certain features may be described as a raised feature, e.g., a ridge, boss, flange, projection or other raised feature, such feature may be positively formed or may be what remains after a recessed feature, e.g., a groove, slot, hole, indentation, recess or other recessed feature, is made. Similarly, while certain features may be described as a recessed feature, e.g., a groove, slot, hole, indentation, recess or other recessed feature, such feature may be positively formed or may be what remains after a raised feature, e.g., a ridge, boss, flange, projection or other raised feature, is made.

Each of the U.S. Provisional Applications, U.S. Patent Applications, and/or U.S. Patents, identified herein is hereby incorporated herein by reference in its entirety, for any purpose and for all purposes irrespective of how it may be referred to or described herein.

Finally, numerical values stated are typical or example values, are not limiting values, and do not preclude substantially larger and/or substantially smaller values. Values in any given embodiment may be substantially larger and/or may be substantially smaller than the example or typical values stated.

What is claimed is:

1. An optical diffuser for a portable light comprising:
   an at least partially cylindrical optically clear body having a substantially flat base at an end for receiving light from a light source and having a complex lens structure at an end distal the substantially flat base, the at least partially cylindrical optically clear body defining a central axis between the substantially flat base and the complex lens structure;
   the complex lens structure including a central conical recess and at least one raised annular part defining a plurality of frustro-conical surfaces coaxial with the central axis and having sloping sides,
   wherein the sloping sides define optical surfaces including:
      a surface that is internally reflective and a surface that is an optical exit through which light exits the complex lens structure, and/or
      a surface that is both internally reflective and an optical exit, and
   wherein the complex lens structure provides a beam of light having a broad beam width and a non-uniform intensity.

2. The optical diffuser for a portable light of claim 1 wherein the complex lens structure comprises:
   a side surface of said at least partially cylindrical optically clear body providing a first optical exit surface;
   a first internally reflective one of the plurality of frustro-conical surfaces for directing light through the first optical exit surface;
   a second one of the plurality of frustro-conical surfaces defining a second optical exit surface; and
   the central conical recess defining an internally reflective conical surface for directing light through the second optical exit surface.

3. The optical diffuser for a portable light of claim 2 wherein the complex lens structure further comprises:
   a third one of the plurality of frustro-conical surfaces defining a third optical exit surface; and
   a third internally reflective one of the plurality of frustro-conical surfaces for directing light through the third optical exit surface.

4. The optical diffuser for a portable light of claim 1 wherein the complex lens structure comprises:
   a first one of the plurality of frustro-conical surfaces defining a first optical exit surface; and
   a first internally reflective one of the plurality of frustro-conical surfaces for directing light through the first optical exit surface.

5. The optical diffuser for a portable light of claim 4 wherein:
   the first internally reflective one of the plurality of frustro-conical surfaces defines a second optical exit surface; and
   the first one of the plurality of frustro-conical surfaces directs light through the second optical exit surface.

6. The optical diffuser for a portable light of claim 1 wherein the plurality of frustro-conical surfaces of the complex lens structure comprise: a parabolic surface, a hyperbolic surface, a concave surface, a convex surface, or a combination thereof.

7. The optical diffuser for a portable light of claim 1 wherein the substantially flat base has a convex lens at a part thereof proximate the central axis.

8. The optical diffuser for a portable light of claim 1 wherein the beam of light produced by the complex lens structure includes light emanating at a half-cone angle of about 55° or greater relative to a central axis of the complex lens structure.

9. The optical diffuser for a portable light of claim 1 wherein the beam of light produced by the complex lens structure includes light emanating at half-cone angles of about 0°, about 55°, about 70° or 75°, and about 90° relative to a central axis of the complex lens structure.

10. The optical diffuser for a portable light of claim 1 further comprising: a mount for movably mounting said optical diffuser over a face of a housing from which at least one light source emits light, wherein the mount is configured to be movable to place the optical diffuser in a first position in front of the at least one light source for passing the light emitted thereby and to place the optical diffuser in a second position not in front of the at least one light source.

11. The optical diffuser for a portable light of claim 10 wherein the mount for movably mounting said optical diffuser over the face of the housing includes:
   a holder having a "C" shape with the distal ends of the C-shaped holder movably engaging the housing; or
   at least one flange on the at least partially cylindrical optically clear body of said optical diffuser for movably engaging a groove of the housing; or
   a holder having a "C" shape with the distal ends of the C-shaped holder movably engaging the housing and at least one flange at least one flange on the at least partially cylindrical optically clear body of said optical diffuser for movably engaging a groove of the housing.

12. The optical diffuser for a portable light of claim 1 further comprising: a holder movable on a housing, wherein said optical diffuser is retained by said holder to be movable on the housing.

13. The optical diffuser for a portable light of claim 12 wherein:
   said holder has a "C" shape with the distal ends of the C-shaped holder movably engaging the housing; or
   said optical diffuser includes at least one flange for movably engaging a groove of the housing; or
   said holder has a "C" shape with the distal ends of the C-shaped holder movably engaging the housing and said optical diffuser includes at least one flange for movably engaging a groove of the housing.

14. The optical diffuser for a portable light of claim 1 wherein the at least partially cylindrical optically clear body comprises: a glass, a clear plastic, a polycarbonate, a polystyrene, or an acrylic.

15. The optical diffuser for a portable light of claim 1 wherein the at least partially cylindrical optically clear body comprises an optical material having an index of refraction of about 1.5.

16. The optical diffuser for a portable light of claim 1 wherein the complex lens structure comprises:
   a side surface of said at least partially cylindrical optically clear body providing a third optical exit surface; and
   a second internally reflective one of the plurality of frustro-conical surfaces for directing light through the third optical exit surface.

17. An optical diffuser for a portable light comprising:
   an at least partially cylindrical optically clear body having a substantially flat base at an end for receiving light from a light source and having a complex lens structure at an end distal the substantially flat base, the at least partially cylindrical optically clear body defining a central axis between the substantially flat base and the complex lens structure;
   the complex lens structure including a central conical recess and at least one raised annular part defining a plurality of frustro-conical surfaces coaxial with the central axis and having sloping sides, wherein the sloping sides define optical surfaces that are internally reflective or that are optical exit surfaces through which light exits the complex lens structure or that are internally reflective optical surfaces and optical exit surfaces, and wherein the complex lens structure provides a beam of light having a broad beam width and a non-uniform intensity;
   wherein the complex lens structure comprises:
   a first one of the plurality of frustro-conical surfaces defining a first optical exit surface; and
   a first internally reflective one of the plurality of frustro-conical surfaces for directing light through the first optical exit surface; and
   wherein: the first internally reflective one of the plurality of frustro-conical surfaces defines a second optical exit surface, and the first one of the plurality of frustro-conical surfaces directs light through the second optical exit surface.

* * * * *